Patented Sept. 6, 1949

2,481,218

UNITED STATES PATENT OFFICE 2,481,218

METHOD OF CURING STORAGE BATTERY PLATES

Alva L. Hindall, Muncie, Ind., assignor to General Motors Corporation, Detroit, Mich., a corporation of Delaware No Drawing. Application March 22, 1943, Serial No. 479,993

4 Claims. (Cl. 136—33)

This invention relates to the manufacture of storage batteries and particularly to the manufacture of the positive plates therefor. This application is a continuation in part of Ser. No. 446,317 filed June 8, 1942, now abandoned, and is related to my copending application Ser. No. 772,952 filed September 9, 1947.

It is an object of the present invention to make a positive plate of such character that it is possible to use the one-step fill. The term "one-step fill" refers to the single step of filling the battery with acid and charging, after which step the battery is ready for service. For example, after the battery parts are assembled in the box and the covers are sealed, the battery is filled with water and dumped. This moistens the plates so that the acid will penetrate the active material more readily. The battery is filled only once with relatively strong sulphuric acid, the specific gravity being in the range of 1.390 to 1.450. The plates stand in the acid for 3-5 hours to pickle during which a normal lead sulphate is formed. Then the battery is charged for a suitable time and at a desired rate, for example, 48 to 52 hours at a rate of one ampere for each positive plate per cell of the automotive size. The formation of the active material of the plates and the charging of the battery is performed in one operation.

The normal lead sulphate which is formed during pickling is one of the least stable of the normal lead sulphates which range in stability from low stability, which is readily convertible to lead peroxide, to such high stability that it is impossible to convert to lead peroxide during charging. The degree of stability is determined by the time of pickling, the activity of the paste material being pickled toward the pickling acid and the strength of the acid. The time of pickling should be no longer than necessary for the acid to react upon all of the paste material. If the paste material has relatively low activity a relatively strong acid solution can be used. If the paste material has relatively high activity a relatively weak acid solution must be used, otherwise a very stable normal lead sulphate is formed during the time required for pickling; and it is practically impossible to convert such lead sulphate to lead peroxide during charging.

If the paste material has relatively low activity it is possible to use a strong pickling acid solution so as to form the plates and finally charge the battery in one operation. If the activity of the paste material is relatively high, then the pickling acid solution must be so weak that it is unsuitable for use as an acid solution in which the plates are given the final charge. Consequently the process of forming and finally charging the plate requires two steps, namely, (1) pickling and forming in relatively weak acid and (2) final charging in a relatively strong acid. This process is known as the "two-step fill."

In order to make it possible to use this "one-step fill," it is necessary to cause the paste of the positive plates to become low in activity with respect to pickling acid so that, acid of sufficient strength to provide for final charging may be used, the normal lead sulphate which is formed during pickling will be low in stability and therefore readily convertible to lead peroxide.

The final paste mix contains lead compounds in colloidal form which are relatively high in activity to pickling acid. By colloidal is meant that the lead compounds are too finely divided to show a definite pattern on an X-ray spectrophotograph. During the curing of the paste, I aim to convert as much of the colloidal lead compounds as possible to basic lead sulphate, $PbSO_4 \cdot 4PbO \cdot 2H_2O$, a crystalline compound, which is low in activity to pickling acid. Then, during pickling, the basic lead sulphate will be transformed to a variety of normal lead sulphate which is low in stability and which is easily convertible to lead peroxide.

In order to detect the presence of the crystalline basic lead sulphate in the cured paste of the positive plates, X-ray spectro-photographs may be made thereof and the X-ray defraction pattern may be compared to a standard pattern obtained by an X-ray spectro-photograph of plate paste cured under the most favorable conditions.

I shall now describe the steps of preparing and curing the paste for a positive plate. Into a paste mixer, there is dumped a quantity of the product of a Barton mill which analyzes approximately 37.5% yellow litharge, 37.5% red litharge and 25% lead and which will be termed Barton litharge hereinafter. The mixer is started and water is gradually added, until a paste-like mass is obtained. Then, sulphuric acid is added gradually which reacts with certain of the ingredients to form lead sulphate and the mixing is continued for a short time after the addition of sulphuric acid has been completed. Red lead is next added and the mixing is continued for a short time. The final paste mix includes hydrated litharge and lead sulphate which compounds are in colloidal form.

In preparing the paste of the positive plate I have found that varying quantities of the ingredients may be used, an example of one of such mixes is as follows.

Between 1200 and 1800 pounds of Barton litharge is placed in a mixer after which water in quantities of from 24 to 32 gallons is slowly added so as to obtain a mix having paste-like consistency. The mixing period for the addition of water may be varied between 3 to 8 minutes. Sulphuric acid which is next added, should be of 1.4 gravity and should be added over a period of upwards to three quarters of an hour in total quantity of from 4.75 to 6 gallons. After the addition of sulphuric acid has been completed the mixer should be run for several minutes before the addition of the red lead if this addition is desired. In this instance, the quantity of red lead should be from 0 to ⅓ of the quantity of Barton litharge. The mixer is run for from 3 to 5 minutes after this addition. After mixing is completed, the final mixture, on a dry weight basis, preferably includes from 60 to 100 parts of Barton litharge from 0 to 40 parts red lead and from 2½ to 10 parts lead sulphate. A part of said mixture becomes hydrated during the mixing process, which hydrated portion together with the lead sulphate is of a colloidal nature. This mixture is then pasted into grids, which are cast in pairs, are pasted preferably by forcing ribbons of paste between and around the grid wires by means of a machine such as is disclosed in Lund application Serial No. 325,408 filed March 22, 1940, now Patent No. 2,375,424, dated May 8, 1945. The pasted grids are received from the pasting machine by a chain conveyor which holds the plates in spaced relation and in a substantially upright position. The freshly pasted plates pass immediately to a curing oven of such length that the treatment of the plate is completed during one pass through the oven which requires about 45 minutes. During the first 15 minutes, each plate moves through circulating air heated by natural gas flames, the products of combustion passing with the circulating air around the plates. The temperature of the air circulating around the plates is 235° F. At the beginning of this treatment the moisture content of the paste is 12.5% to 13%. At the end of the treatment by circulating air the moisture content should be around 9%. After this preliminary treatment, each plate passes for 30 minutes through a zone of non-circulating moisture charged air of approximately 100% relative humidity at a temperature of 200° F. to 220° F. The temperature and humidity is maintained by live-steam at one pound per square inch pressure.

The plates then pass through a break-apart machine which separates the plates from a web of metal which held them together during pasting and curing. Then the plates are stacked until ready for use. After stacking, the plates age in air.

During the treatment in humidified air, the formation of crystalline basic lead sulphate takes place (in variable percentages preferably between 20 and 40% although this figure may vary without markedly affecting the result), and this formation uses up much of the colloidal lead compounds. It is important that this formation take place when the moisture content has been reduced to approximately 9% of the paste. If the reaction takes place before moisture content has been reduced to 9%, the paste will be too fragile and the paste pellets will readily drop from the grid. If the moisture content is reduced much below 9% (8½% is almost too low), this formation will not take place at all because the paste has lost too much moisture. A satisfactory plate could be made if the moisture content were around 10% at the time the plate arrived at the humid zone, but it would require an increase in time to complete the formation of crystals. Therefore, it is preferable to cause the plate to pass to the humid zone when the moisture content of its paste has been reduced to approximately 9%. During the treatment in the curing oven, all of the yellow litharge and most of the free lead of the paste has been converted to red litharge, some of which becomes crystalline basic lead sulphate.

A positive plate made according to this process can be easily handled without danger of dislodging the active material which is firmly attached to the grid wires. The active material is easily converted to lead peroxide during formation in the one-step fill. A battery having positive plates made according to this process gives improved performance both as to discharge rate and cycling life. Furthermore, this process is one which can be relied on to produce uniformly good positive plates.

During the curing process, I aim to set up a micro-structure of the cured paste which will be stable and uniform throughout. I aim to improve the ruggedness of the plate by controlling the crystal size and structure of the basic lead sulphate developed during the curing process. This improvement is obtained with a micro-structure of relatively small crystals uniform throughout the cross-section of the paste. The quantities of time and temperature are those which have been found satisfactory for the particular paste mixture which has been described. It is to be understood that other paste mixtures require different values of temperature and time. However, it is understood that whatever variation is made, it is for the purpose of obtaining a desired micro-structure which will conform within reasonable limits to a standard X-ray diffraction pattern. In order to know whether the curing process is being carried on in the proper manner, samples of cured paste are taken from the plates at certain intervals during manufacture and are subjected to the action of an X-ray spectroscope to determine whether the X-ray diffraction pattern conforms to the standard pattern.

While the embodiment of the present invention as herein disclosed, constitutes a preferred form, it is to be understood that other forms might be adopted, all coming within the scope of the claims which follow.

What is claimed is as follows:

1. The manufacture of storage battery plates which comprises; pasting the plate with the paste comprising as a major ingredient an aqueous reaction mixture of yellow litharge, red litharge, metallic lead and sulphuric acid, said ingredient including colloidal lead compounds which are readily convertible to basic lead sulphate and which contain in excess of 9% moisture; drying the pasted plate for about fifteen minutes for reducing the moisture content of the plate paste to approximately 9% by weight and then subjecting the plate to a moisture charged atmosphere at a temperature and for a time about twice the aforementioned drying time for causing crystalline basic lead sulphate to be formed from the colloidal lead compounds and simultaneously cause the plate paste to be cured to a rugged structure firmly attached to the plate.

2. The manufacture of storage battery plates which comprises; pasting the plate with a paste comprising as a major ingredient 100 parts of an aqueous reaction mixture of yellow litharge, red litharge, metallic lead and sulfuric acid, and from 0 to 33 parts of red lead, said ingredient including colloidal lead compounds which are readily convertible to basic lead sulphate and containing in excess of 9% moisture; drying the pasted plate for about fifteen minutes for reducing the moisture content of the paste to approximately 9% by weight and then subjecting the plate to hot moisture charged air at approximately 100% humidity and at a temperature of from 200 to 220° F. for about thirty minutes to effect formation of crystalline basic lead sulphate from the colloidal lead compounds and simultaneously to cause the plate paste to be cured to a rugged structure firmly attached to the plate.

3. The step in the process of making a storage battery plate having a paste comprising as a major ingredient an aqueous reaction mixture of yellow litharge, red litharge, metallic lead and sulphuric acid, said ingredient including colloidal lead compounds which are readily convertible to basic lead sulphate and including water therein of about 9% by weight which consists in; subjecting the plate paste to a moisture charged atmosphere of high humidity at a temperature of from 200 to 220° F. and for about thirty minutes to cause crystalline basic lead sulphate to be formed from the colloidal lead compounds and simultaneously to cause the plate paste to be cured to a rugged structure firmly attached to the plate.

4. The step in the process of making a storage battery plate having a paste containing as a major ingredient 100 parts of an aqueous reaction mixture of yellow litharge, red litharge, metallic lead and sulphuric acid and from 0 to 33 parts of red lead, said ingredient including colloidal compounds which are readily convertible to basic lead sulphate and having a moisture content by weight of about 9% which consists in; subjecting the pasted plate to air at approximately 100% humidity and at a temperature from 200 to 220° F. for about thirty minutes to effect formation of crystalline basic lead sulphate from the colloidal lead compounds and simultaneously to cause the plate paste to be cured to a rugged structure firmly attached to the plate.

ALVA L. HINDALL.

REFERENCES CITED

The following references are of record in the file of this patent:

UNITED STATES PATENTS

| Number | Name | Date |
| --- | --- | --- |
| 1,572,512 | Benner | Feb. 9, 1926 |
| 1,572,586 | Weir | Feb. 9, 1926 |
| 1,603,291 | Pepper | Oct. 19, 1926 |
| 1,629,636 | Plews | May 24, 1927 |
| 1,668,801 | Calbeck | May 8, 1928 |
| 1,670,047 | Plews | May 15, 1928 |
| 1,806,180 | Reinhardt | May 19, 1931 |
| 1,888,823 | Hall | Nov. 22, 1932 |
| 2,068,434 | Rose | Jan. 19, 1937 |
| 2,130,246 | Olcott et al. | Sept. 13, 1938 |
| 2,249,330 | Stewart | July 15, 1941 |
| 2,287,868 | Daily | June 30, 1942 |
| 2,315,188 | Clapson | Mar. 30, 1943 |
| 2,347,131 | Seabury et al. | Apr. 18, 1944 |

OTHER REFERENCES

Darbyshire, J. A., J. Sc. Insts., May, 1941, page 99.

Mrgudich, J. N., Trans. Electrochemical Society, vol. 81. Released April 20, 1942. Pages 165–172. Pages 168–9 relied on.